US011893658B2

(12) United States Patent
Worman et al.

(10) Patent No.: US 11,893,658 B2
(45) Date of Patent: Feb. 6, 2024

(54) AUGMENTED VEHICLE TESTING ENVIRONMENT

(71) Applicant: The Regents of the University of Michigan, Ann Arbor, MI (US)

(72) Inventors: Tyler S. Worman, Ypsilanti, MI (US); Huei Peng, Ann Arbor, MI (US); Gregory J. McGuire, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 17/889,563

(22) Filed: Aug. 17, 2022

(65) Prior Publication Data

US 2023/0053687 A1 Feb. 23, 2023

Related U.S. Application Data

(60) Provisional application No. 63/233,953, filed on Aug. 17, 2021.

(51) Int. Cl.
| | |
|---|---|
| *B60K 35/00* | (2006.01) |
| *G06T 19/00* | (2011.01) |
| *G06F 3/01* | (2006.01) |
| *G02B 27/01* | (2006.01) |
| *G02B 27/00* | (2006.01) |
| *G06T 11/00* | (2006.01) |

(52) U.S. Cl.
CPC .................. *G06T 11/00* (2013.01)

(58) Field of Classification Search
CPC ....... G06T 11/00; G06T 19/006; G06F 3/013; G02B 27/017; G02B 27/0172; G02B 27/0093
See application file for complete search history.

(56) References Cited

U.S. PATENT DOCUMENTS

| | | | |
|---|---|---|---|
| 10,332,292 B1* | 6/2019 | Arnicar | G01C 21/3863 |
| 2022/0036758 A1* | 2/2022 | Oh | G06T 19/006 |
| 2022/0134881 A1* | 5/2022 | Wickman | G02B 27/0093 |
| | | | 701/36 |
| 2022/0155093 A1* | 5/2022 | Fear | G01C 21/3664 |
| 2023/0023906 A1* | 1/2023 | Pestov | G06F 3/011 |

* cited by examiner

*Primary Examiner* — Lixi C Simpson
(74) *Attorney, Agent, or Firm* — Reising Ethington P.C.

(57) ABSTRACT

An augmented virtual vehicle testing system and method for presenting graphics to a vehicle operator during operation of a vehicle. The method includes: determining a position of a vehicle operator within a vehicle testing environment; executing an augmentative simulation of the vehicle testing environment, wherein the augmentative simulation is used to provide a position of one or more virtual objects within the vehicle testing environment; generating graphics representing the one or more virtual objects based on the position of the vehicle operator and the position of the one or more virtual objects within the vehicle testing environment; and presenting the graphics on an electronic display and to the vehicle operator during operation of the vehicle.

11 Claims, 2 Drawing Sheets

AUGMENTED VEHICLE TESTING ENVIRONMENT

TECHNICAL FIELD

This disclosure relates to methods and systems for presenting graphics of one or more virtual objects during operation of a vehicle.

BACKGROUND

During vehicle testing, it may be desirable to introduce virtual objects into the vehicle's environment so that various testing scenarios may be used for testing without having to actually acquire and/or operate real instances of those objects. The vehicle's and other devices within the environment may be configured to treat the virtual objects as real objects and to operate as if such virtual objects were actually present within the vehicle's environment.

SUMMARY

In accordance with an aspect of the disclosure, there is provided a method of presenting graphics to a vehicle operator during operation of a vehicle. The method includes: determining a position of a vehicle operator within a vehicle testing environment; executing an augmentative simulation of the vehicle testing environment, wherein the augmentative simulation is used to provide a position of one or more virtual objects within the vehicle testing environment; generating graphics representing the one or more virtual objects based on the position of the vehicle operator and the position of the one or more virtual objects within the vehicle testing environment; and presenting the graphics on an electronic display and to the vehicle operator during operation of the vehicle.

According to various embodiments, this method may further include any one of the following features or any technically-feasible combination of some or all of these features:
  the electronic display is a display of a pair of augmented reality (AR) glasses;
  the position of the vehicle operator is determined at least in part based on a location of the AR glasses;
  the AR glasses include a global navigation satellite system (GNSS) receiver, and wherein the location of the AR glasses is determined based on GNSS signals that are received by the GNSS receiver;
  a real-time kinematic (RTK) positioning technique is used as a part of determining the location of the AR glasses;
  the vehicle includes an onboard computer that is configured to carry out the augmentative simulation;
  the onboard computer is further configured to provide the graphics of the one or more virtual objects to the electronic display or a device having the electronic display and to provide the position of the one or more virtual objects within the vehicle testing environment to the electronic display or the device having the electronic display;
  the vehicle testing facility includes a traffic signal or control, and wherein, as a part of the augmentative simulation, at least one of the one or more virtual objects is configured to respond to a state of the traffic signal or control;
  the traffic signal or control is a traffic signal that is used to control traffic by emitting light;
  the traffic signal or control is a boom barrier that obstructs a road of the vehicle testing facility;
  the vehicle testing facility includes a traffic signal or control that is controlled at least in part on information obtained by a sensor, and wherein, as a part of the augmentative simulation, a state of the traffic signal or control is changed as a result of a presence of at least one of the one or more virtual objects as if the at least one virtual object were each actually a real object that was proximate a location at which the traffic signal or control is located; and/or
  the at least one virtual object is a virtual vehicle, wherein the traffic signal or control is a traffic signal, and wherein the sensor is used to detect traffic on a road at which the traffic signal is located.

In accordance with another aspect of the disclosure, there is provided an augmented virtual vehicle testing system that includes: at least one computer having one or more processors; at least one non-transitory, computer-readable memory storing computer instructions; and an electronic display that is configured to present graphics representing one or more virtual objects to a vehicle operator in an augmented reality fashion and that is communicatively coupled to the at least one computer. The one or more processors are configured to execute the computer instructions that, when executed, cause the augmented virtual vehicle testing system to: (i) determine a position of the vehicle operator within a vehicle testing environment; (ii) execute an augmentative simulation of the vehicle testing environment, wherein the augmentative simulation is used to provide a position of the one or more virtual objects within the vehicle testing environment; (iii) generate the graphics representing the one or more virtual objects based on the position of the vehicle operator and the position of the one or more virtual objects within the vehicle testing environment; and (iv) present the graphics on an electronic display and to the vehicle operator during operation of the vehicle.

According to various embodiments, this augmented virtual vehicle testing system may further be configured according any one of the features listed above in connection with the disclosed method or any technically-feasible combination of some or all of such features.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The system and method described herein enables graphics representing one or more virtual objects to be presented to a vehicle operator or other individual during operation of a vehicle. In at least some embodiments, the graphics are presented in an augmented reality fashion such that the virtual object(s) appear to be present within the vehicle's environment. As discussed above, during vehicle testing, it may be desirable to introduce virtual objects into the vehicle's environment. However, while virtual objects, such as virtual vehicles or pedestrians, may be treated by the vehicle and roadside infrastructure as real objects when used as a part of a simulated testing environment, humans within the environment may realize that such virtual objects are in fact virtual and not respond or react as if the virtual objects were real. Thus, the system and method described below aims to provide, at least according to some implementations and embodiments, graphics of one or more virtual objects that are presented to a vehicle operator (or other individual) during operation of a vehicle such that the virtual object(s) appear as real object(s) so that reactions of the vehicle operator may be evoked or elicited as if those virtual object(s) were real.

The graphics are presented to the vehicle operator using an electronic display. According to one embodiment, the graphics are presented to the vehicle operator using a pair of augmented reality (AR) or virtual reality (VR) glasses, such as a pair of optical-see-through AR goggles or glasses or a pair of video-based AR glasses. In another embodiment, the graphics are presented to the vehicle operator using a vehicle display, which may be a heads up display (HUD) or another see-through windshield display. The position, including the location and orientation, of the electronic display on which the graphics are presented (or of the device having the electronic display) may be constantly monitored so that the graphics may be rendered in the appropriate position and orientation as well as sized accordingly. A simulation may be executed during operation of the vehicle within the testing facility and this simulation may be used to determine the position, location, speed, direction, and/or other attributes of the one or more virtual objects. Thus, this simulation is used to augment the vehicle's environment with virtual objects, and is referred to as an augmentative simulation. The graphics of the virtual objects may then be rendered according to the augmentative simulation.

Figure 1:
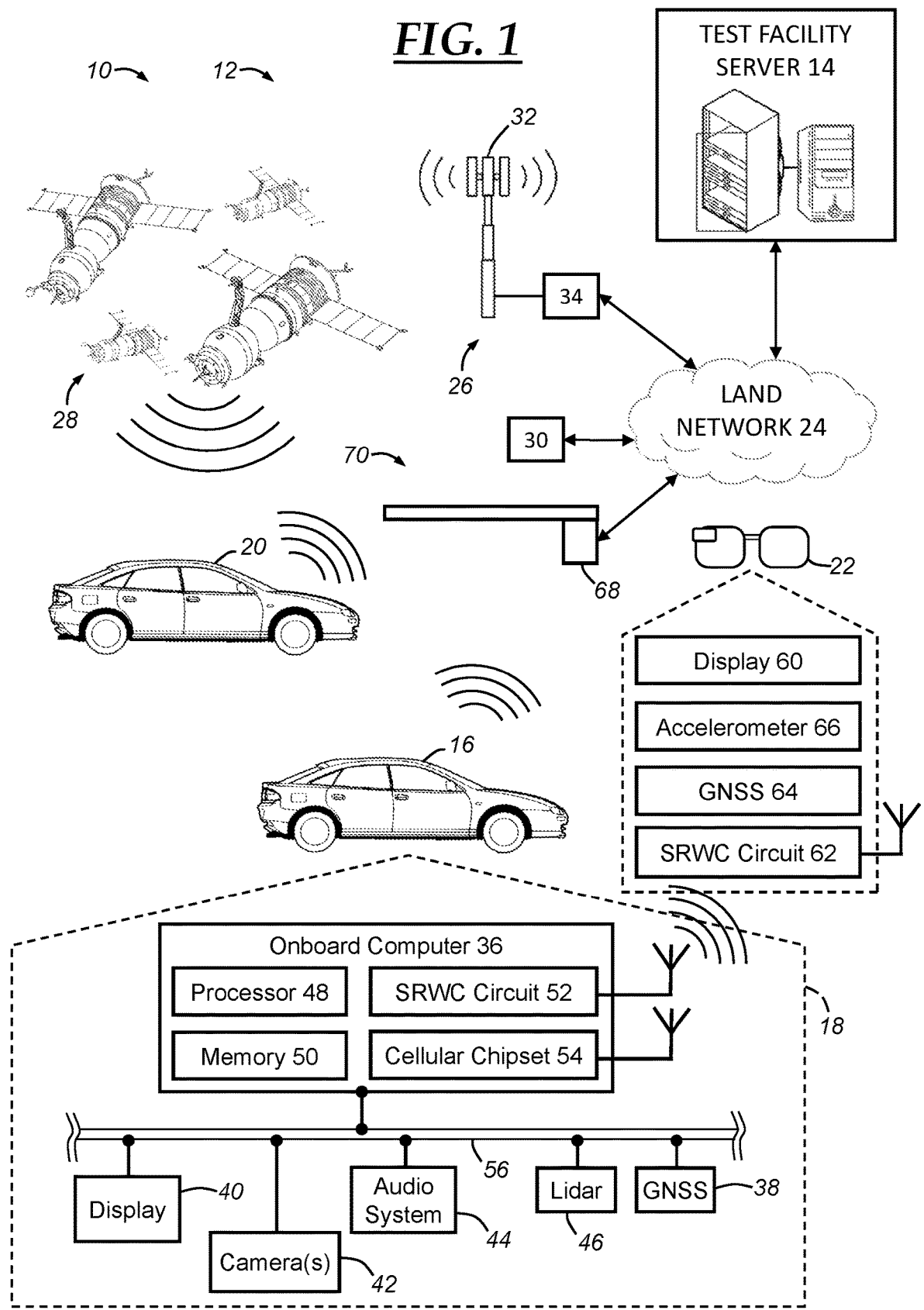
FIG. 1 depicts a communications system that includes an augmented virtual vehicle testing system that is used to present graphics of one or more virtual objects during operation of a vehicle according to one embodiment.

With reference now to FIG. 1, there is shown an operating environment that comprises a communications system 10 that is used at a testing facility 12, a testing facility server 14, a first real vehicle 16 having vehicle electronics 18, a second real vehicle 20, a pair of augmented reality (AR) glasses (referred to also as "AR glasses") 22, a land network 24, a wireless carrier system 26, a constellation of global navigation satellite system (GNSS) satellites 28, a real-time kinematic (RTK) base station 30, a boom barrier 68, and an augmented virtual vehicle testing system 70. The testing facility 12 is an example of a vehicle testing environment at which the method (FIG. 2) may be carried out or used. In some embodiments, the vehicle testing environment may be located at a private testing facility and, in other embodiments, the vehicle testing environment may comprise one or more public roads or areas, such as a parking lot. It should be appreciated that while the illustrated embodiment of FIG. 1 provides an example of one such communications system 10, the system and method described below may be used as part of various other communications system.

The land network 24 may be a conventional land-based telecommunications network that is connected to one or more landline telephones and connects the wireless carrier system 26 to the testing facility server 14. For example, the land network 24 may include a public switched telephone network (PSTN) such as that used to provide hardwired telephony, packet-switched data communications, and the Internet infrastructure. One or more segments of the land network 24 could be implemented through the use of a standard wired network, a fiber or other optical network, a cable network, power lines, other wireless networks such as wireless local area networks (WLANs), or networks providing broadband wireless access (BWA), or any combination thereof.

The wireless carrier system 26 may be any suitable cellular telephone system. The wireless carrier system 26 is shown as including a cellular tower 32; however, the wireless carrier system 26 may include additional cellular towers as well as one or more of the following components (e.g., depending on the cellular technology): base transceiver stations, mobile switching centers, base station controllers, evolved nodes (e.g., eNodeBs), mobility management entities (MMEs), serving and PGN gateways, etc., as well as any other networking components required to connect the wireless carrier system 26 with the land network 24 or to connect the wireless carrier system 26 with user equipment (UEs, e.g., which may include telematics equipment in the vehicles 16,20 and/or in the AR glasses 22), all of which is indicated generally at 34. The wireless carrier system 26 can implement any suitable communications technology, including for example GSM/GPRS technology, CDMA or CDMA2000 technology, LTE technology, etc. In general, the wireless carrier system 26, its components, the arrangement of its components, the interaction between the components, etc. is generally known in the art.

The testing facility server 14 may be used to provide a backend to one or more components of the test facility 12. In one embodiment, the test facility server 14 may deploy simulation data that is used to define certain attributes of an augmentative simulation that is carried out at the first real vehicle 16. In another embodiment, the test facility server 14 is used to store information concerning one or more components of the test facility 14 and/or to control one or more components of the test facility 14, such as the boom barrier 68 or other traffic signal or control (e.g., a traffic light or other traffic signal). The testing facility server 14 is a server that is carried out by one or more computers, each of which includes a processor and a non-transitory, computer-readable memory that is accessible by the processor.

Any one or more of the processors discussed herein may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the non-transitory, computer-readable memory discussed herein may be implemented as any suitable type of memory that is capable of storing data or information in a non-volatile manner and in an electronic form so that the stored data or information is consumable by the processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that the computers may include other memory, such as volatile RAM that is used by the processor, and/or multiple processors.

The real vehicles 16,20 are each depicted in the illustrated embodiment as a passenger car, but it should be appreciated that any other vehicle including motorcycles, trucks, sports utility vehicles (SUVs), recreational vehicles (RVs), bicycles, other vehicles or mobility devices including those that can be used on a roadway or sidewalk, etc., can also be used. As depicted in the illustrated embodiment, the first real vehicle 16 includes the vehicle electronics 18, which include an onboard computer 36, a GNSS receiver 38, a vehicle display 40, one or more cameras 42, an audio system 44, a lidar sensor 46, and a vehicle communications bus 56. FIG. 1 provides an example of certain components of the vehicle electronics 18 of the first real vehicle 16, however, it should be appreciated that the vehicle electronics 18 may include one or more other components.

The global navigation satellite system (GNSS) receiver 38 receives radio signals from the constellation of GNSS satellites 28. The GNSS receiver 38 uses the received radio signals to generate location data that represents the location of the GNSS receiver and, thus, the first real vehicle 16 on which it is installed. In one embodiment, such as where the testing facility 12 is within the United States, the GNSS receiver 38 may be a global positioning system (GPS) receiver. In another embodiment, such as where the testing facility 12 is within Europe, the GNSS receiver 38 may be a GNSS receiver configured to be used with Galileo. In addition to the location data, which may represent a location as a geographical coordinate pair, the GNSS receiver 38 may also specify the time associated with each location. This time and location data that is obtained by a GNSS receiver based on GNSS signals is referred to as GNSS data. The GNSS receiver 38 may use a real-time kinematic (RTK) technique to determine the position, which may use signals from the RTK base station 30.

The vehicle display 40 is an electronic display that is a part of the first real vehicle 16. In one embodiment, the vehicle display 40 is used to present graphics to the vehicle operator or other vehicle passenger during operation of the vehicle. The vehicle display 40 may be any of a variety of suitable vehicle displays and, in some embodiments, may be configured to display augmented reality graphics to one or more vehicle operators or passengers. In one embodiment, the vehicle display 40 is a heads up display (HUD) that projects light that reflects off of the windshield of the first real vehicle 16. In another embodiment, the vehicle display 40 is an organic light-emitting diode (OLED) film that is installed on a windshield of the first real vehicle 16 and that includes controllable pixels that may be used to present graphics or may be transparent so that the vehicle operator or passenger may view the vehicle's surroundings. Thus, in at least some embodiments, the OLED film may be used to augment a real field of view of a vehicle operator or passenger with generated graphics.

The one or more cameras 42 are each used to obtain image data of one or more objects within the environment, which can include color information of one or more objects. The camera(s) 42 may each be any suitable digital camera. The camera(s) 42 are each connected to the vehicle communications bus 56 and may provide image data to the onboard computer 36 and/or the vehicle display 40. In one embodiment, one or more of the cameras 42 is a stereoscopic camera that is used to capture range or distance information, which may be used to determine position information of one or more objects within the test facility 12. The camera(s) 42 are connected to the vehicle communications bus 56 and may provide image and/or range data to the onboard computer 36. The audio system 44 includes one or more speakers that are used to provide audio to occupants of the first real vehicle 16.

The lidar sensor 46 is used to obtain lidar sensor data of one or more objects within the environment, and the lidar sensor data can include range and position information of these object(s). The lidar sensor 46 emits non-visible light waves that reflect off of object(s) and then receives the reflected waves. It should be appreciated that various types of lidar devices may be used, including, for example, those manufactured by Velodyne™, such as, for example, the Alpha Prime™, the Ultra Puck™, Puck™, etc. The lidar sensor 46 is connected to the vehicle communications bus 56 and may provide lidar sensor data to the onboard computer 36.

The onboard computer 36 includes a processor 48 and non-transitory, computer-readable memory 50 that is accessible by the processor 48. The onboard computer 36 may be used for various processing that is carried out at the first real vehicle 16 and, in one embodiment, may be used to carry out one or more steps of the method 200 (FIG. 2), which is discussed below. The onboard computer 36 is connected to the vehicle communications bus 56 and may send messages to, and receive messages from, other vehicle components using this bus 56. The onboard computer 36 also includes a short-range wireless communications (SRWC) circuit 52 and a cellular chipset 54 that are used for wireless communications. The SRWC circuit 52 includes an antenna and is configured to carry out one or more SRWC technologies, such as any one or more of the IEEE 802.11 protocols (e.g., IEEE 802.11p, Wi-Fi™), WiMAX™, ZigBee™, Z-Wave™, Wi-Fi Direct™, Bluetooth™ (e.g., Bluetooth™ Low Energy (BLE)), and/or near field communication (NFC). The cellular chipset 54 includes an antenna and is used for carrying out cellular communications or long-range radio communications with the wireless carrier system 26.

The AR glasses 22 are shown as including a display 60 that operates by projecting light onto a reflective waveguide. However, according to other embodiments, various other types of AR glasses, goggles, or device may be used as the AR glasses and the term "AR glasses" is used herein to cover any AR device that is configured to be worn by a user so that the user is able to view AR graphics of the AR device. In some embodiments, a VR headset may be used instead. It should be appreciated that the discussion of the AR glasses also applies to VR headsets in embodiments where VR headsets are used to the extent that such discussion is technically feasible with respect to VR headsets as will be appreciated by those skilled in the art. The display 60 of the AR glasses 22 is an electronic display and may be used for presenting graphics to a vehicle operator during operation of a vehicle, such as the first real vehicle 16. While the display 60 of the AR glasses is discussed as operating by projecting light onto a reflective waveguide, it should be appreciated that other types of displays may be used, such as liquid crystal displays (LCDs).

The AR glasses 22 include a processor and memory, which may be any of those types of processing devices or memory discussed above. At least in one embodiment, the AR glasses 22 include a SRWC circuit 62 and an antenna for communicating with the onboard computer 36. In some embodiments, the AR glasses 22 may include a cellular chipset for use in carrying out communications with other components of the system 10 using the wireless carrier system 26. In at least some embodiments, the AR glasses 22 are configured to receive information from the onboard computer 36 using the SRWC circuit 60 and then to generate graphics using the received information, which is then displayed to the vehicle operator or other individual that is wearing the AR glasses 22. In other embodiments, instead or in addition to the SRWC circuit 62, the AR glasses 22 may include a modem or other interface for carrying out wired communications with another device, such as the onboard computer 36. For example, in such an embodiment, the AR glasses 22 and the onboard computer 36 are connected via a universal serial bus (USB) cable.

In the illustrated embodiment, the AR glasses 22 also include a GNSS receiver 64. The GNSS receiver 64 uses the received radio signals to generate location data that represents the location of the GNSS receiver 64 and, thus, the location of the vehicle operator that is wearing the AR glasses 22. In addition to the location data, which may represent a location as a geographical coordinate pair, the GNSS receiver 64 may also specify the time associated with each location. The GNSS receiver 64 may use a RTK technique to determine the position, which may use signals from the RTK base station 30. The AR glasses 22 also include an accelerometer 66 that is used to determine an orientation of the AR glasses 22 with respect to gravity. In at least one embodiment, the accelerometer 66 is a three-axes accelerometer that is used to measure the orientation of the AR glasses 22 with respect to three-axes. It should be appreciated that various different types of accelerometers may be used according to various embodiments.

The boom barrier 68 includes a boom arm that is pivoted between an obstructed position and a non-obstructed position and is used to obstruct a road, such as to prevent a vehicle from passing. The boom barrier 68 may controlled (e.g., the boom arm may be pivoted up) in response to sensor information that indicates the presence of a vehicle or other event or state of the test facility 12, based on a controller that is configured to receive information or input from a user, based on information received from a vehicle or other device present at the test facility 12, and/or based on information received from the test facility server 14. The boom barrier 68 is an example of a traffic signal or control, which is any real component that is used to provide signals to traffic at the vehicle testing environment or to control traffic of the vehicle testing environment. Other examples of a traffic signal or control include a pedestrian boom barrier or gate that obstructs a sidewalk, a traffic light, and a crosswalk signal.

According to various embodiments, the test facility 12 may include one or more different or additional traffic signals or controls, which may be controlled based on sensor information that indicates the presence of a vehicle or other event or state of the test facility 12, based on a controller that is configured to receive information or input from a user, based on information received from a vehicle or other device present at the test facility 12, and/or based on information received from the test facility server 14. In one embodiment, simulated sensor data may be generated as a part of an augmentative simulation and sent to one or more traffic signals or controls, which may then respond (or change states) in response to receiving this simulated sensor data. Additionally or alternatively, control data generated as a part of an augmentative simulation may be sent to one or more traffic signals or controls and used to control the traffic signal or control, such as to raise or lower the boom arm.

The augmented virtual vehicle testing system 70 includes at least one computer and an electronic display. In the illustrated embodiment, the augmented virtual vehicle testing system 70 includes the onboard computer 36 of the first real vehicle 16 and the AR glasses 22. In another embodiment, the augmented virtual vehicle testing system 70 includes the onboard computer 36 of the first real vehicle 16 and the vehicle display 40. The at least one computer of the augmented virtual vehicle testing system 70 includes one or more processors and at least one non-transitory, computer-readable memory that each is accessible by at least one of the one or more processors. The at least one memory stores computer instructions that, when executed by the one or more processors, cause the augmented virtual vehicle testing system 70 to carry out one or more steps of the method discussed herein, such as those steps of the method 200, which is discussed below.

Figure 2:
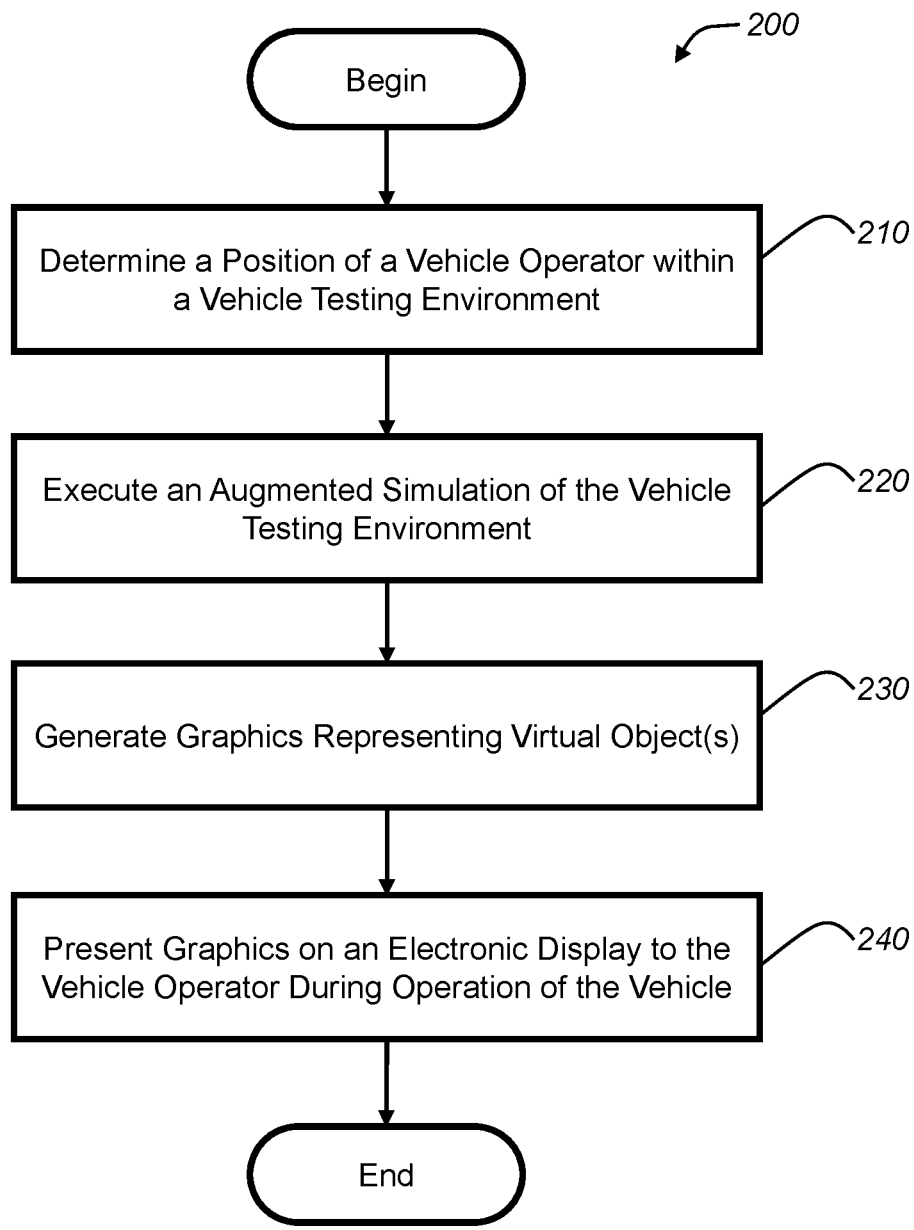
FIG. 2 is a flowchart of a method of presenting graphics to a vehicle operator during operation of a vehicle according to one embodiment.

With reference to FIG. 2, there is shown an embodiment of a method 200 of presenting graphics to a vehicle operator during operation of a vehicle. According to at least some embodiments, the method 200 is used to present the graphics to the vehicle operator so that one or more virtual objects appear to be present within the vehicle's environment. In the embodiment discussed below, the vehicle's environment is a vehicle testing environment in which experiments or tests are carried out using one or more real vehicles. According to at least some embodiments, these tests or experiments are augmented by introducing graphics into the vehicle operator's field of vision. And, in one embodiment, these graphics, which may be configured to appear as real objects, are presented to the vehicle operator such that the vehicle operator is not able to easily or readily discern whether the objects are real or virtual. During operation of the vehicle, the vehicle operator uses an electronic display to view at least part of his/her surroundings. The electronic display may be the display 60 of the AR glasses 22 or a VR headset, or may be the vehicle display 40, which may be a heads up display (HUD), for example. The presence, size, orientation, and position of the graphics, which represent the virtual objects, within the vehicle operator's field of view may be determined as a result of the position of the vehicle operator and the position of the virtual object(s). The position of the virtual object(s) may be determined through executing an augmentative simulation. The augmentative simulation is a simulation of one or more virtual objects within the vehicle testing environment and is used to define the position of each of the virtual object(s). The virtual object(s) may include stationary objects, such as trees or fixed roadside barriers, or moving objects, such as vehicles or pedestrians.

The method 200 begins with step 210, wherein a position of a vehicle operator within a vehicle testing environment is determined. The position of the vehicle operator is used to determine whether one or more virtual objects are to be rendered on the electronic display and, if so, may be used to determine various display attributes concerning those virtual object(s), such as the size, orientation, and position of the graphics within the vehicle operator's field of view. The position of the vehicle operator includes the location of the vehicle operator, which, at least according to one embodiment, is determined as the position of the AR glasses 22 within the vehicle. For example, the GNSS receiver 64 of the AR glasses 22 uses GNSS signals from the GNSS satellites 28 to determine the position of the AR glasses 22. In one embodiment, the AR glasses 22 use a uses a RTK technique, which may use signals from the RTK base station 30, to determine a more accurate or precise position. In at least some embodiments, the position may further specify an orientation of the vehicle operator, which may be determined as the orientation of the electronic display or device having the electronic display. For example, the orientation of the vehicle operator may be determined as the orientation of the AR glasses 22, which may be determined through use of the accelerometer 66 of the AR glasses 22.

In other embodiments, such as those where the electronic display that is to be used to present the graphics is the vehicle display 40, the position of the vehicle operator may be (or at least based on) a determined location of the vehicle.

In one embodiment, the location of the vehicle is determined by the GNSS receiver 38 based on GNSS signals received from the GNSS satellites 28, and this location may be determined based on RTK techniques, at least in some embodiments. In one embodiment, the camera(s) 42 obtain image data of the vehicle's surroundings and then use image processing techniques to determine the location and/or orientation of the first real vehicle 16 within the vehicle testing environment. For example, the vehicle testing environment may include markers (e.g., QR codes) that are placed around the environment at various points and image processing techniques may be used to identify these markers and the vehicle's location and/or orientation relative thereto. A spatial model of the vehicle testing environment may indicate the position of each marker within the vehicle testing environment and so the position of the vehicle may be determined based on the position of the marker(s) in the image data and the position of the marker(s) within the spatial model. Additionally, in some embodiments, range sensor data may be used to determine the location and/or position of the first real vehicle 16 within the vehicle testing environment. This range sensor data may be obtained from one or more stereoscopic cameras or lidar sensors installed on the first real vehicle 16. In one embodiment, one or more accelerometers of the vehicle are used to determine the orientation of the vehicle. The method 200 continues to step 220.

In step 220, an augmentative simulation of the vehicle testing environment is executed, and the augmentative simulation operates to augment the vehicle testing facility with one or more virtual objects. The augmentative simulation provides the position, including the location and orientation, of the one or more virtual objects as they are configured to (virtually) exist at the vehicle testing environment. In one embodiment, a first virtual object is a virtual vehicle that is driving along a road of the vehicle testing environment, and a second virtual object is a virtual traffic cone that is placed on a road of the vehicle testing environment. The augmentative simulation may be carried out over a period of time and, at least for moving virtual objects, the position and orientation may be calculated numerous times (e.g., every 0.1 seconds).

Moreover, in some embodiments, the method includes operating one or more real components of the vehicle testing environment, such as the boom barrier 68 or other traffic signal or control, in response to the position of the virtual object(s) and/or based on preprogrammed conditions. For example, a virtual vehicle may approach the boom barrier 68 and, in response to the presence of the virtual vehicle, the boom barrier 68 may be actuated (e.g., the boom arm blocking the road may be pivoted upward) so as to emulate a real scenario where the boom barrier 68 allows a real vehicle through. The device or system that is executing the augmentative simulation, which may be the onboard computer 36, may send one or more control signals to the one or more real components, which may function to operate as if one or more of the virtual object(s) were actually real objects present at the vehicle testing environment and interacting (or causing) the real component(s) to respond. In one embodiment, control signals that control the operation of the real component(s) may be sent from the test facility server 14 to the real component(s).

In another embodiment, the augmentative simulation is used at least in part to simulate a virtual accident between the second real vehicle 20, which may be an autonomous vehicle, and a virtual object. For example, a virtual vehicle may run a red light and then virtually strike the second real vehicle 20, which may respond to this simulated event by automatically actuating brakes of the second real vehicle 20 and stopping in place. Graphics of this virtual accident may be presented to the vehicle operator (step 240) of the first real vehicle 16.

In one embodiment, the augmentative simulation of the vehicle testing environment is executed by the onboard computer 36. In another embodiment, the augmentative simulation of the vehicle testing environment is executed by the testing facility server 14. And, in another embodiment, part of the augmentative simulation of the vehicle testing environment is executed by the onboard computer 36 and part of the augmentative simulation of the vehicle testing environment is executed by the test facility server 14. In such embodiments, information concerning the virtual object(s), such as the position of the virtual object(s) and/or graphics representing the virtual object(s), may be sent to the real vehicle 16 via the land network 24 and/or the wireless carrier system 26. The method 200 continues to step 230.

In step 230, graphics representing the one or more virtual objects are generated based on the position of the vehicle operator. The graphics may be based on three-dimensional models of the virtual object(s) that are stored at the test facility server 14 and/or the onboard computer 36 of the real vehicle 16. In one embodiment, the onboard computer 36 generates the graphics representing the one or more virtual objects and, in another embodiment, the AR glasses 22 generate the graphics. In another embodiment, the test facility server 14 generates the graphics representing the one or more virtual objects and then sends data representing these graphics to the real vehicle 16 and/or the AR glasses 22. In yet another embodiment, position information concerning the virtual object(s) is sent to the electronic display or the device having the electronic display, such as the AR glasses 22 that have the display 60. The position information of a virtual object is information that indicates a position of the virtual object within the vehicle testing environment.

The generated graphics may be generated based on one or more three-dimensional graphical models of the virtual object(s) and, in one embodiment, generating the graphics includes recalling the one or more three-dimensional graphical models from memory, such as the memory 50 of the onboard computer 36. The three-dimensional graphical model(s) represent the virtual object(s); for example, where a first virtual object is a virtual vehicle, a first three-dimensional graphical model may be a graphical model of a vehicle. The three-dimensional graphical model(s) may be provided to the AR glasses 22, the vehicle display 40, or another electronic display or device having an electronic display, which may then render or present the graphics for viewing by the vehicle operator (step 240).

In one embodiment, the onboard computer 36 provides, for each of the one or more virtual objects, position information, which indicates a position of the virtual object within the vehicle testing environment. For example, in embodiments where the electronic display is the display 60 of the AR glasses 22, the three-dimensional graphical model(s) and the position information of the virtual object(s) may be sent to the AR glasses 22. The AR glasses 22 may then generate the graphics, which may be based on one or more display attributes, which may include, for example, the size, orientation/perspective, position within the image frame. The one or more display attributes may be determined by the AR glasses 22 and based on the position information and the three-dimensional graphical model(s).

The position of the vehicle operator may be used in determining the one or more display attributes of the virtual object(s).

In one embodiment, the onboard computer 36 obtains information about one or more real objects within the vehicle testing environment and then this information is used when determining whether to generate certain graphics. For example, a virtual vehicle may be (virtually) present and located in front of the first real vehicle 16 and a tree may be detected to be disposed within a line of sight between a rear portion of the virtual vehicle and the vehicle operator of the first real vehicle 16. The detection of the tree may be carried out based on sensor data (e.g., range data) from the lidar sensor 46 and/or image or range data from the camera(s) 42, for example. Thus, in such a scenario, it may be determined to omit graphics representing the rear portion of the virtual vehicle since, if the virtual vehicle were actually a real vehicle that was present within the vehicle testing environment, the vehicle operator would not be able to be see the rear portion of the real vehicle.

In another embodiment, the onboard computer 36 may not send position information to the electronic display or the device having the electronic display. The onboard computer 36 may determine the one or more display attributes of the virtual object(s) and/or render the graphics by generating images of the virtual object(s) that are to be presented to the vehicle operator. For example, in embodiments where the electronic display is the vehicle display 40, the onboard computer 36 may generate the graphics and then send image data representing these graphics to the vehicle display 40, which then presents the graphics (step 240). The method 200 continues to step 240.

In step 240, the graphics are presented on an electronic display and to the vehicle operator during operation of the vehicle. In one embodiment, the electronic display is the display 60 of the AR glasses 22. In such embodiments, the graphics are presented to the vehicle operator on the display 60 of the AR glasses 22 and in a manner such that the virtual object(s) appear to be real objects that actually exist within the vehicle testing environment. The graphics correspond to a particular position within the vehicle testing environment and so when the field of view of the AR glasses 22 (or vehicle operator/user) changes, the graphics are rendered in a way so that they appear to remain at their designated position within the vehicle testing environment. In another embodiment, the electronic display is the vehicle display 40 of the first real vehicle 16 and, in such embodiments, the graphics are presented to the vehicle operator on the vehicle display 40 and in a manner such that the virtual object(s) appear to be real objects that actually exist within the vehicle testing environment. Since the graphics correspond to a particular position within the vehicle testing environment, when the vehicle moves (or at least when the field of view that is being displayed on the vehicle display 40 changes), the graphics are rendered in a way so that they appear to remain at their designated position within the vehicle testing environment. The method 200 then ends.

In another embodiment, instead of using the method 200 to present graphics to a vehicle operator, the graphics may be presented to another individual, such as another vehicle passenger that is not operating the vehicle or a pedestrian. In such embodiments, the method steps may be carried out so as to present graphics of virtual object(s) such that the virtual object(s) appear to be real objects that actually exist within the user's environment. For example, a vehicle passenger may wear the AR glasses 22 and the position of the vehicle passenger may be determined in step 210. The graphics may then be presented to the vehicle passenger in step 240. Such an embodiment may be useful, for example, when the vehicle passenger is a part of an experiment, such as where vehicle accidents are being simulated and it is desirable to obtain responses of vehicle passengers as if the vehicle accidents had actually occurred.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of presenting graphics to a vehicle operator during operation of a vehicle, comprising the steps of:
determining a position of a vehicle operator within a vehicle testing environment;
executing an augmentative simulation of the vehicle testing environment, wherein the augmentative simulation is used to provide a position of one or more virtual objects within the vehicle testing environment;
generating graphics representing the one or more virtual objects based on the position of the vehicle operator and the position of the one or more virtual objects within the vehicle testing environment; and
presenting the graphics on an electronic display and to the vehicle operator during operation of the vehicle,
wherein the vehicle testing environment includes a traffic signal or control that is controlled at least in part on information obtained by a sensor, and wherein, as a part of the augmentative simulation, a state of the traffic signal or control is changed as a result of a presence of at least one of the one or more virtual objects as if the at least one virtual object were each actually a real object that was proximate a location at which the traffic signal or control is located.

2. The method of claim 1, wherein the electronic display is a display of a pair of augmented reality (AR) glasses.

3. The method of claim 2, wherein the position of the vehicle operator is determined at least in part based on a location of the AR glasses.

4. The method of claim 3, wherein the AR glasses include a global navigation satellite system (GNSS) receiver, and wherein the location of the AR glasses is determined based on GNSS signals that are received by the GNSS receiver.

5. The method of claim 4, wherein a real-time kinematic (RTK) positioning technique is used as a part of determining the location of the AR glasses.

6. The method of claim 1, wherein the vehicle includes an onboard computer that is configured to carry out the augmentative simulation.

7. The method of claim 6, wherein the onboard computer is further configured to provide the graphics of the one or more virtual objects to the electronic display or a device having the electronic display and to provide the position of the one or more virtual objects within the vehicle testing environment to the electronic display or the device having the electronic display.

8. The method of claim 1, wherein the traffic signal or control is a traffic signal that is used to control traffic by emitting light.

9. The method of claim 1, wherein the traffic signal or control is a boom barrier that obstructs a road of the vehicle testing facility.

10. The method of claim 1, wherein the at least one virtual object is a virtual vehicle, wherein the traffic signal or control is a traffic signal, and wherein the sensor is used to detect traffic on a road at which the traffic signal is located.

11. An augmented virtual vehicle testing system, comprising:
at least one computer having one or more processors and at least one non-transitory, computer-readable memory storing computer instructions; and
an electronic display that is configured to present graphics representing one or more virtual objects to a vehicle operator in an augmented reality fashion and that is communicatively coupled to the at least one computer;
wherein the one or more processors are configured to execute the computer instructions that, when executed, cause the augmented virtual vehicle testing system to:
determine a position of the vehicle operator within a vehicle testing environment;
execute an augmentative simulation of the vehicle testing environment, wherein the augmentative simulation is used to provide a position of the one or more virtual objects within the vehicle testing environment;
generate the graphics representing the one or more virtual objects based on the position of the vehicle operator and the position of the one or more virtual objects within the vehicle testing environment; and
present the graphics on an electronic display and to the vehicle operator during operation of the vehicle,
wherein the vehicle testing environment includes a traffic signal or control that is controlled at least in part on information obtained by a sensor, and wherein, as a part of the augmentative simulation, a state of the traffic signal or control is changed as a result of a presence of at least one of the one or more virtual objects as if the at least one virtual object were each actually a real object that was proximate a location at which the traffic signal or control is located.

\* \* \* \* \*